US007209981B1

(12) United States Patent
Wade et al.

(10) Patent No.: US 7,209,981 B1
(45) Date of Patent: Apr. 24, 2007

(54) SYSTEM AND METHOD FOR SWITCHING DATA STORAGE DEVICES AND MULTIPLE PROCESSORS

(75) Inventors: Jack P. Wade, La Jolla, CA (US); Joel Brown, Leucadia, CA (US)

(73) Assignee: Z Microsystems, Inc., San Diego, CA (US)

(*) Notice: Subject to any disclaimer, the term of this patent is extended or adjusted under 35 U.S.C. 154(b) by 367 days.

(21) Appl. No.: 10/754,934

(22) Filed: Jan. 9, 2004

(51) Int. Cl.
*G06F 3/00* (2006.01)
*G06F 13/00* (2006.01)
*G06F 13/36* (2006.01)

(52) U.S. Cl. .................. 710/38; 710/36; 710/40; 710/42; 710/300

(58) Field of Classification Search ............... 710/38, 710/300, 36, 40, 42
See application file for complete search history.

(56) References Cited

U.S. PATENT DOCUMENTS

| 5,126,890 | A | | 6/1992 | Wade et al. ............ 360/60 |
| 5,280,398 | A | | 1/1994 | Wade et al. ............ 360/60 |
| 5,455,934 | A | * | 10/1995 | Holland et al. ............ 711/4 |
| 5,552,776 | A | | 9/1996 | Wade et al. ............ 340/825.31 |
| 6,370,605 | B1 | * | 4/2002 | Chong, Jr. ............ 710/38 |
| 6,542,961 | B1 | * | 4/2003 | Matsunami et al. ............ 711/114 |
| 6,578,158 | B1 | * | 6/2003 | Deitz et al. ............ 714/11 |
| 2003/0110330 | A1 | * | 6/2003 | Fujie et al. ............ 710/36 |
| 2004/0083338 | A1 | * | 4/2004 | Moriwaki et al. ............ 711/114 |

OTHER PUBLICATIONS

Information Brochure by APT Technologies, Inc. et al., "SERIAL ATA—Serial ATA in Servers and Networked Storage," prepared by Serial ATA, 2002, 12 pages in length.
Dell Computer Corporation et al., "Serial ATA II: Cables and Connectors vol. 1," Revision 1.0, Feb. 28, 2003, pp. 1-28.
http://biz.yahoo.com/bw/030512/125176_1.html, entitled: "Vitesse Adds to Serial ATA Product Line with Enterprise Class Switch," printed Jun. 24, 2003, 2 pages in length.
Seagate Technologies, Inc., "Fibre Channel Interface," Seagate Product Manual, Publication No. 77767496, Rev. A, 1997, 315 pages in length.

* cited by examiner

*Primary Examiner*—Kim Huynh
*Assistant Examiner*—Joshua D. Schneider
(74) *Attorney, Agent, or Firm*—Fitch, Even, Tabin & Flannery

(57) ABSTRACT

A system is provided for switching the I/O channel for disk drives between multiple computers. The system incorporates the switch into removable drive modules, or a docking base for a removable drive module. The incorporation of switching into the system, such that it is integral with the drives, can reduce overall system failures, by reducing the number of elements which flow through a central switching element. Thus, even where a switch fails other drive modules of the system may continue to operate in the system and provide information to different computers of the system.

7 Claims, 6 Drawing Sheets

Fig. 1 Prior Art System

SYSTEM AND METHOD FOR SWITCHING DATA STORAGE DEVICES AND MULTIPLE PROCESSORS

FIELD OF THE INVENTION

The present invention relates to a system which provides for switching of the input output (I/O) channel of a storage device between at least two distinct computers.

BACKGROUND

Highly available computing is the process of designing a computer network so that system operations can continue to operate even with the malfunction or other unexpected interruption to a component of a computing network. Such systems are utilized in situations that demand a high degree of reliability. The goal of highly available networks is to provide duplicate network components to reduce the risk of a single point of failure. In the event of a component failure, duplicate or backup components can take over the role of a failed component, where a component is a general term which can include devices such as a networking switch, a storage device, a computer, or any additional device that may connect to computer network. There are a variety of possible configurations for highly available systems and typically the more effective configurations provide for duplication of components.

One example of a prior system 100 is shown in FIG. 1. This system includes two distinct computer systems, computer 102 and computer 104, each with an independent CPU, RAM, I/O bus(es) for user input devices (e.g. keyboard and mouse), and I/O bus(es) for external system devices (e.g. network switches, printers, storage devices, etc.). The system 100 includes an external switch 106 that connects input/output (I/O) ports of each computer system to two separate docking bases, 112 and 114. Each docking base in turn connects to external removable storage modules 108 and 110. These storage modules are typically individual hard disk drives.

The actual implementation of these systems can be accomplished in a number of different ways. For example, some systems are configured in a system rack device which holds a number of separate boxes, and each box could correspond to a different computer or associated computer device such as storage systems or networking components. Each computer would be able to operate independently and would have its own CPU, power supply, RAM, etc. Storage devices in the rack could take different forms. One such device is a storage module chassis which is designed to hold removable storage disk drives. In environments where security is of concern removable storage modules can be provided where the storage modules are designed to be easily removed and inserted into receptacles of the storage module chassis. Issued U.S. Pat. No. 5,126,890, and issued U.S. Pat. No. 5,280,398 discuss different aspects of removable disk drive storage modules, and each of these references is incorporated herein by reference in its entirety. Both of these patents are assigned to the same assignee as the present patent application.

In addition to the above patents describing aspects of removable disk drives, U.S. Pat. No. 5,552,776 also discusses aspects of removable disk drives, and also describes systems and methods related to providing for security by controlling access between different computers and storage modules. The U.S. Pat. No. 5,552,776 is also assigned to the assignee of the present patent application, and is incorporated herein by reference in its entirety.

System 100 of FIG. 1 contains removable storage modules 108 and 110. The system 100 allows for each removable storage module to be inserted into a receptacle in a storage module chassis. Each receptacle in the storage module chassis provides a docking base with a connector for receiving a connector from the removable storage module. For example storage module 108 is shown as being coupled with docking base 112 of a storage module chassis, and storage module 110 is coupled with docking base 114 of a storage module chassis. The I/O channel of the storage module 108 is coupled through the docking base 112 to a switch which is external to the docking base and the storage module. The I/O channel of the storage module 110 is coupled through the docking base 114 to the switch 106. The switch 106 is controlled to provide computers 102 and 104 access to the different storage modules.

This approach of providing an external switch 106 adds potential compatibility and interoperability problems. Such issues increase the complexity and cost of the system, reduce the reliability or uptime of the system, and introduced control issues. For example, if a particular storage module is not working with a computer, then the failure could be in either the storage module or the switch. Further, the central switch acts as a single point of failure. If the switch fails it is likely that the computers may not have access to any of the storage modules.

The above described system is just one example of creating a highly available system utilizing an external switch. Another example of a prior system, is one that utilizes disk storage modules which have two I/O channels and two I/O ports. An existing such storage system is the Fiber Channel (FC) interface drive provided by Seagate Technology LLC. In systems where these drives are configured for RAID operation a single or dual redundant RAID controller can access either port of the drives by means of a hub or a switch inserted in the FC loop between the drives and the controllers. With a hub, there is no switching as all drive ports are seen by the controllers. It is up to the RAID controller programming to arbitrate which computer owns each drive. If a drive port goes bad the RAID controller and the computer can continue using the other port. In a dual RAID controller mode, if one of the RAID controllers fails, the other controller can take ownership the drives. The hub or switch provides the connectivity and the RAID controllers provide the switching, redundancy and failover intelligence. Hubs or switches on the computer channels are required to do failover transparent to the host.

At the network level, between the RAID box and the host computers, FC switches can provide switching and multipath redundancy. There is usually some storage area network (SAN) control mechanism that involves firmware or software on the host computer, the switches and the RAID controllers. On the RAID controller there is a method called SAN masking, which controls which host computers can have assess to each RAID set. Switches can be zoned to partition traffic and control access. SANs can be very complicated and often have interoperability problems between all of the pieces of the systems. At the host level, multipath software can reroute traffic through a redundant connection to the Raid box.

DETAILED DESCRIPTION

Figure 1:
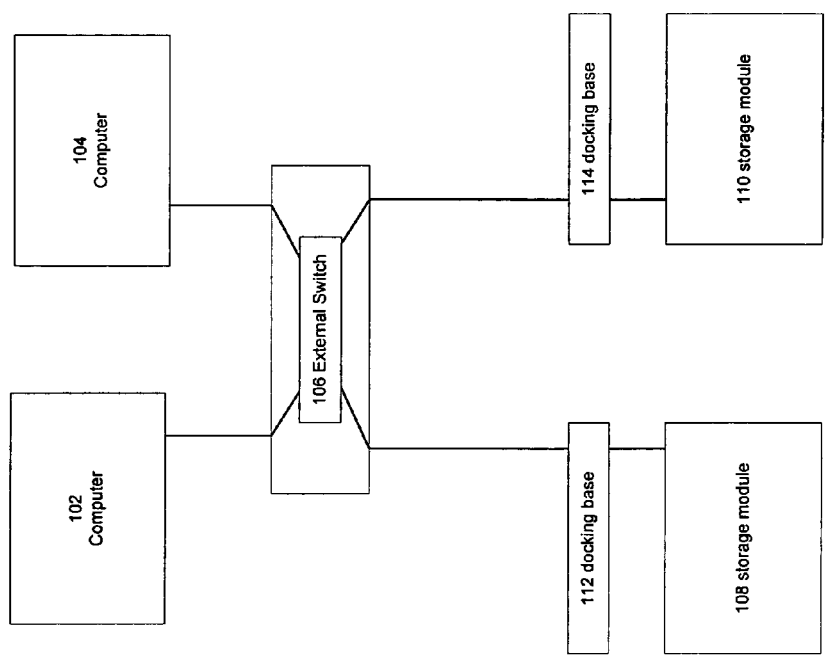
FIG. 1 is a diagram illustrating a prior art system.
Figure 2:
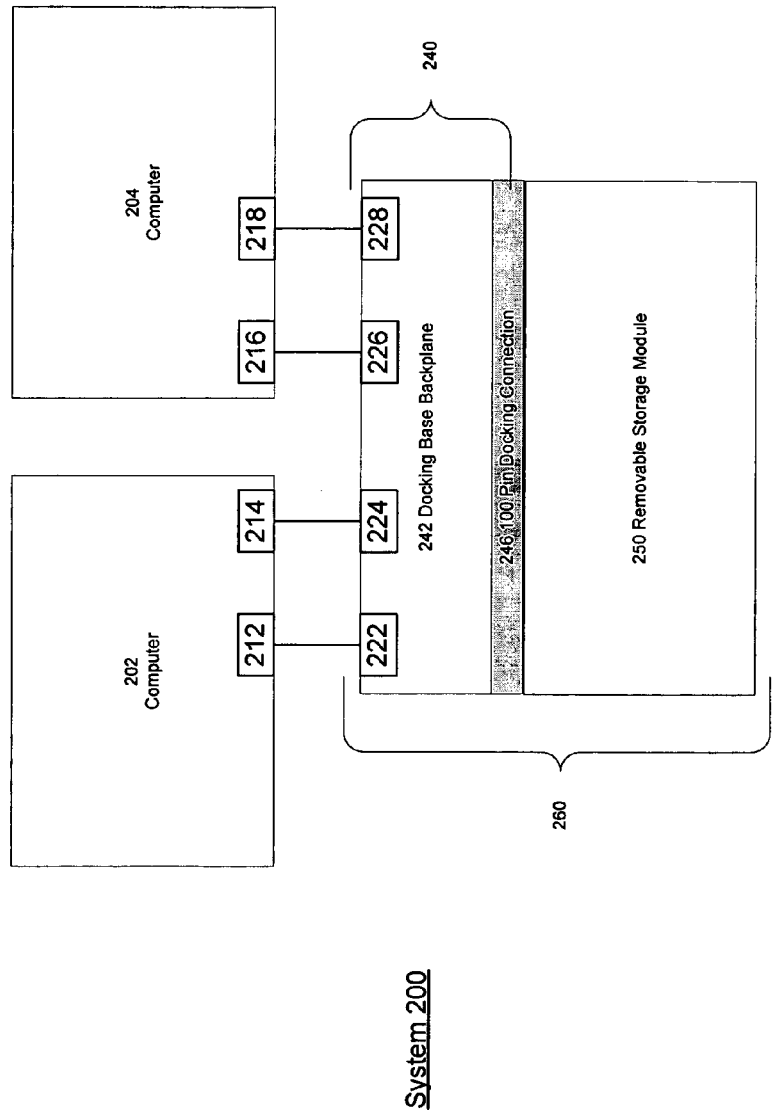
FIG. 2 is a diagram illustrating an embodiment of the present invention.

FIG. 2 shows a system 200 of an embodiment of the present invention. The system 200 has two computers 202 and 204 connecting to a docking base backplane 242 of a docking base 240 via multiple I/O ports. Computer 202 connects to the docking base backplane 242 through a Serial ATA (SATA) I/O port 212 coupled to a docking base SATA port 222, and a Universal Serial Bus (USB) I/O port 214 coupled to the docking base USB I/O port 224. Also included is a second computer 204 having a SATA I/O port 216 coupled to the docking base SATA I/O port 226, and a USB I/O port 218 coupled to the docking base USB I/O port 228. In addition, to the connections shown in FIG. 2, there would also be I²C connections between computer 202 and docking base back plane 242, and between computer 204 and backplane 242, which are note shown. These I²C connections could operate to couple a PCI RAID Controller within each computer 202 and 204 which implements industry standard SES (Storage Enclosure Services) protocol, in a situation where the removable storage module contains multiple disk drives, operating in a RAID configuration. These I²C connections allow for communication between the raid controllers and a PIC Microcontroller on the docking base backplane 242.

The removable storage system 260 includes two physical units: the docking base unit 240 and the removable storage module 250. Both the docking base unit 240 and the removable storage module 250 can include a housing which can be formed of metal, plastic or another suitable material, and inside the housing are other elements such as backplanes and components mounted to the backplanes which are discussed in more detail below. Two important elements of the docking base unit include: the docking base backplane 242, and a connector 246 in one embodiment is a 100 pin docking connector. The docking base backplane 242 has I/O connectors for power, Serial ATA interfaces, USB interfaces, and I2C interfaces that connect to the motherboards of computers 202 and 204. The 100 pin docking connector 246 is physically joined to the docking base unit 240 and its backplane 242, and is used to connect the removable storage module 250 to the docking base 240 and the docking base backplane 242 base unit 240 both physically and electronically. The docking base backplane 242 contains a mechanical guiding mechanism to insure proper mating of the connector of the removable storage module 250 with the 100 pin docking connection 246. The docking base backplane 242 also provides a grounding mechanism, in the form of conductive gaskets, to the removable storage module 250 in order to reduce electromagnetic interference. The removable storage module 250 is a device that includes a housing in which multiple disk drives can be mounted. The ability to insert and remove the removable storage module 250 from the docking base unit 240, allows for enhanced security and protection of information stored on the disk drives.

Figure 3:
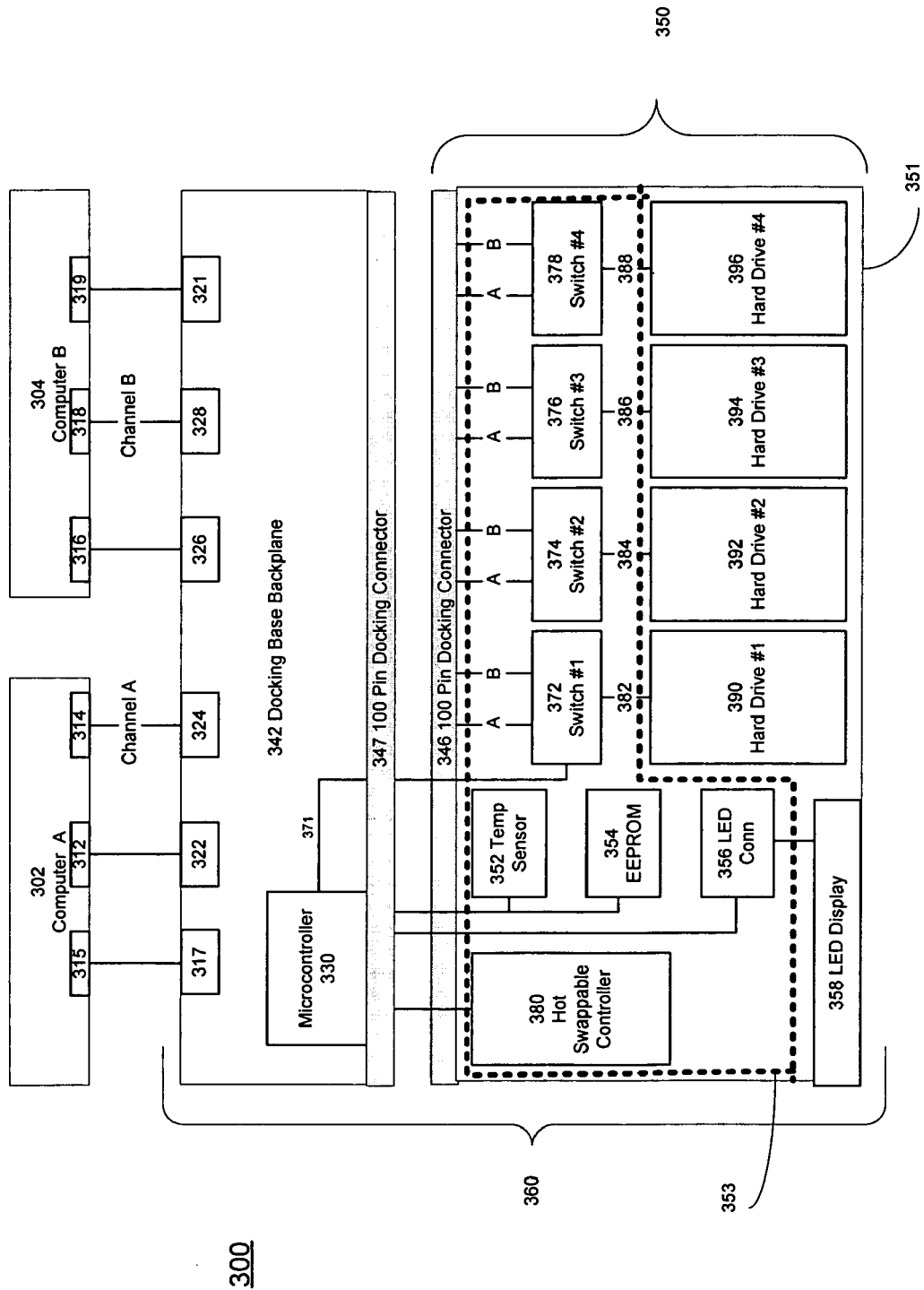
FIG. 3 is a diagram illustrating an embodiment of the present invention.

FIG. 3 provides additional details for a system 300 of an embodiment herein. The removable storage module 350 is docked by connecting the docking connector 346 of the removable storage module 350 with the docking connector 347 of the docking base 340 which results in the removable storage module 350 being electrically and physically connected with the docking base 340 and the docking base backplane 342. This mating of the connectors provides power and communication signals for the elements of the removable disk drive module 350. The docking pin connectors of FIG. 3 are shown as 100 pin connectors, but depending on specific implementations, it may be desirable to use a 120 pin connector, or a connector with fewer numbers of pins. In some circumstances providing a higher number of pins can be advantageous because it would allow for providing power and communications with more elements in the removable storage module 350. For example, in one embodiment which is contemplated for used in a cold weather environment it maybe desirable to provide a heating unit in the removable module.

The housing 351 of the removable storage module 350 can include mounting brackets, shock absorbers, or other means for securing hard disk drives 390–396 inside of the housing. The docking base backplane 342 provides the physical interface between the removable storage module 350 and the corresponding computers 302 and 204. The docking base backplane 342 includes USB, SATA, I²C, and power interfaces. Inside the docking base unit resides a microcontroller 330 which is mounted to the docking base backplane 342. The microcontroller 330 that determines which I/O channel (A or B) will access the individual disk drives located within the removable storage module 350. In one embodiment the microcontroller monitors the two computers 302 and 304 via the USB interfaces 322 and 326 and determines whether the I/O channel will be set to A or B. In one embodiment, the microcontroller 330 will only change the channel if there is a malfunction in the currently active computer system. Ports 315 and 317 provide for I2C signals between computer 302 and the microcontroller 330, and ports 319 and 321 provide for I2C communication between computer 304 and the microcontroller 330.

In one embodiment the removable storage module 350 includes four disk drives 390–396 and a removable storage module backplane 353. Mounted to the removable storage module backplane 353 and associated with each disk drive is a switch 372–378 that connects to the I/O channels 382–388 of the disk drives 390–396. The disk drives could be mounted to a separate backplane, or they could be mounted to the backplane 353. One suitable switch is a serial ATA Failover Switch (VSC7175) available from Vitesse Semiconductor Corp. located in Camarrillo, Calif. The I/O channels can be set to either A or B where each letter corresponds to one of the attached computers 302 and 304. The microcontroller 330 will set the channel of the switch via the control line 371 which is shown as being coupled to switch 372, but additional connections would be provided to each of the switches. In one embodiment, the operation is such that all of the switches for the I/O channels, 382–388 for each of the drives, are coupled via the switches to either the A channel or the B channel, and all of the drives will be connected to the same channel at a particular time. For example, if computer 302 is currently active but suddenly fails, the microcontroller 330 will notify each switch 372–378 to change from channel A to channel B, where channel A corresponds to computer 302 and channel B corresponds to computer 304. The data that is transmitted along I/O channels 382–388 will then switch from channel A to channel B. Under these circumstances, computer 304 will then be the primary computer and all I/O to the disk drives will be controlled by computer 304. As shown the I/O channel for each of the drives is coupled to a first port of the switches. Each of the switches has a second port which corresponds to an A channel, and the A channel is routed through the docking base backplane to the computer 302. Each of the switches also has a third port which corresponds to a B channel, and the B channel is routed through the docking base backplane to the computer 304.

The microcontroller 330 has several additional functions besides controlling the I/O channel. The microcontroller 330 also monitors the temperature of the system through the temperature sensor 352 located inside the removable storage module 350. Further, data in the EEPROM memory chip 354 is accessed by the microcontroller and can provide additional security, as described in the U.S. Pat. No. 5,552,766. The microcontroller 330 also transmits the status of the system to the LED connection 356. The information is then displayed to users of the storage system via a LED display 358. The LED displays such information as disk drive activity, current operational channel, and warning indicators for environmental conditions. In one embodiment, the microcontroller 330 sends and receives communications among the temperature sensor 352 and tracker EEPROM memory 354 via an I²C bus, and LED connection 356 via parallel port bits.

In a preferred embodiment, disk drives 390–396 could be in a RAID configuration to provide enhanced reliability and data recovery should one of the disk drives fail. RAID operation for a group of disk drives is generally widely known, and is a concept first defined by David A. Patterson, Garth Gibson and Randy H. Katz of the University of California, Berkeley in 1987. At its most basic level RAID operation uses an a disk array of a number of small, inexpensive disk drives to exceed the performance of a single, large, expensive disk drive. In addition, since RAIDs use a number of small drives, features can be added to protect against the loss of data when a single drive fails. This redundancy is why Raids have become so popular in high-availability applications. RAID is an acronym for Redundant Array of Independent Disks. There are six levels of RAID: level 0–level 5. Each level supports a different storage layout scheme on the disk drives, from mirroring to parity striping.

The disk drives or the removable storage module could also support other configurations. Although not shown, the storage module chassis can provide a controller for controlling aspects of the operation of the disk drives. In some implementations the removable storage module 350 could contain more or fewer than 4 drives per module. For higher numbers of drives per removable storage module it may be necessary to use smaller form factor disk drives. For example, individual 2.5" disk drives, which are now commonly used in laptops, could be utilized in the removable storage module described herein. One suitable 2.5" SATA drive is the Fujitsu Model No. MHT2080AH. Other possible drives can also be used, such as Serial Attached SCSI (SAS) drives. The same physical connector and electrical interfaces can be used for both SATA and SAS drives. Disk drives utilizing high-speed serial communication I/O channels are utilized in one embodiment of the invention. These drives can utilize ATA and SCSI protocols with a serial data interface, instead of a parallel interface. Utilizing a serial interface allows fewer transmission lines per I/O channel. Thus, multiple I/O channels can be provided between a docking base connector and the different CPUs, where in the past the number of lines required for parallel interfaces, frequently made it impractical to provide for multiple I/O channels.

To provide for control of the operation disk drives, for example in a RAID configuration, a controller is required to coordinate the operation of the drives. This controller could be incorporated into the storage system 360, or it could be located external to the storage system 360 in computers 302 and 304. Where the controller is incorporated in the storage system 360, it could be implemented with a PCI card inserted into a PCI slot which is connected with the docking base backplane 342, where such an implementation would require that the docking base backplane contain a motherboard or some sort of computer system to support the PCI slots. Where controllers are external to the storage system 360, the controllers can be either hardware or software based and be either incorporated into, or controlled by computers 302 and 304. Also referenced in FIG. 3 is the hot-swappable controller 380. This controller 380 enables the removable storage module 350 to be inserted into and removed from the docking base without requiring recycling of the power. This enables efficient and safe insertion and removal of the storage module 350.

Figure 4:
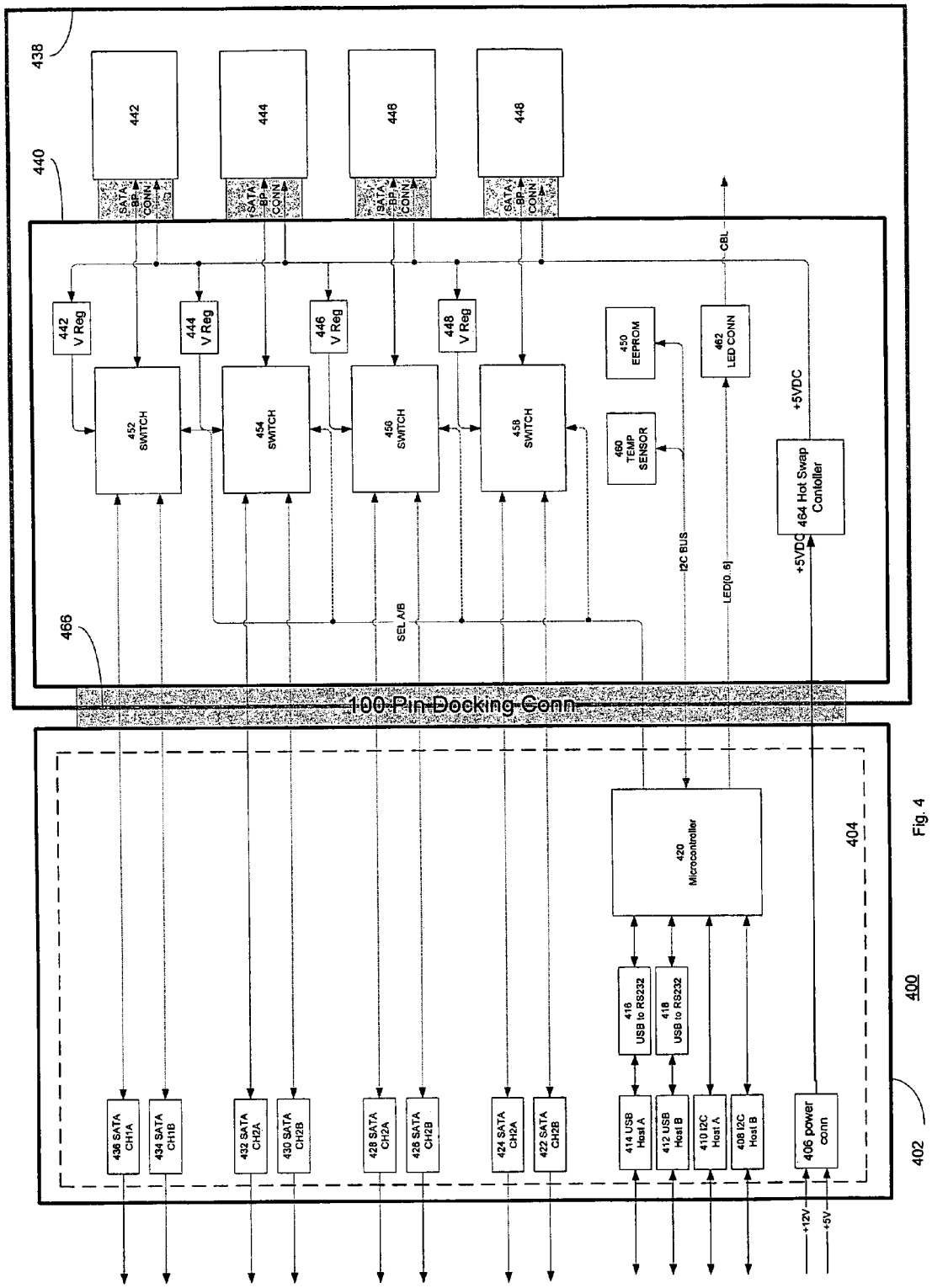
FIG. 4 is a diagram illustrating an embodiment of the present invention.

FIG. 4 shows additional details of an embodiment of system 400 herein. In the system 400 a docking base unit 402 is provided. This docking base unit 402 could be one of a number of docking base units which are provided in a storage module chasses, which is shown in more detail in FIG. 5. The docking base unit 402 includes a docking base backplane 404, which can be a printed circuit board to which other components of the docking base unit are mounted. The docking base unit includes a power connector 406 which can receive input power from the storage module chassis. As shown the power connector 406 receive a +12V and a +5V input from the storage module chassis. The docking base unit also includes an I2C connector 408 and a USB connector 412 for receiving control communications from a host computer B; and the docking base unit includes an I2C connector 410 and a USB connector 414 for receiving communications from host computer A. The I2C connectors will typically be used for receiving communications form the drive controllers such as RAID controller. The USB connectors will generally be used for receiving other communications from the host computers. The communications received from the host computers are then transmitted to the microcontroller 420 of the docking base unit 402.

The docking base unit also includes pairs of connectors 422–436 for transmitting data between each of the drives 442–448 of the removable storage module 438 and the host computers. Each drive has a corresponding pair of connectors, where one of the connectors is for communicating between the drive and one of the host computers, and the other connector is for communicating between the drive and the other host computer. For example, data would be transmitted between a computer host A, and drive 442, through connector 436, and data would be transmitted between a computer host B, and drive 442 through connector 343. The docking base unit 402 has a connector which mates with a connector of removable storage module 438, and the mated connectors are shown in system 400 as a 100 pin docking connection 466.

The removable storage module 438 includes 4 disk drives (442–448). In one embodiment these drives could be 2.5" SATA drives. These drives are coupled via SATA back plane connectors to the backplane 440 of the removable storage module 438. The backplane 440 receives a +5VDC voltage from the docking base unit 402. This power supply voltage is managed by a hot swap controller 464. The 5VDC controlled by the hot swap controller is supplied to switches 452–458 via voltage regulators 442–448. These voltage regulators can be used to adjust the voltage applied to the switches; for example in one embodiment where a Vitesse switch (VSC7175 SATA 2:1 Switch) is used the voltage regulators would convert the +5VDC to a +3.3 V for driving the switches. The +5VDC from the hot swap controller 464 is also supplied to the drives 442–448. The I/O channel of the drives is input to a first port a switch, and the switch is then used to connect the I/O channel of the drive with either an A channel or a B channel. The microcontroller 420 outputs a signal to each of the switches 452–458 to control whether the I/O ports of the drives are coupled with the A channel or the B channel. The Microcontroller also outputs signals on an I2C bus to communicate with a temperature sensor 460 on the back plane 440, and to communicate with the EEPROM 450 of the removable storage module. The microcontroller 420 also outputs signals through a LED connector 462 and then via a cable to LEDS (not shown) on the front of the removable storage module. In one embodiment the front of the removable storage module would have a least 6 LEDs which would indicate which, if any, of the four drives were active, whether host A computer or host B computer is active, and an alarm LED could indicate if there is a problem (such as excessive temperature) with the operation of the removable storage module.

The above description of the removable storage module and the docking base unit show the switches which are coupled to the I/O channels for each of the drives as being incorporated into the removable storage module. It should recognized that some of the advantages herein would also be obtained if the switches were incorporate into the docking base unit. For example if one of the switches failed then only data from only on of the drives would be effected.

Figure 5:
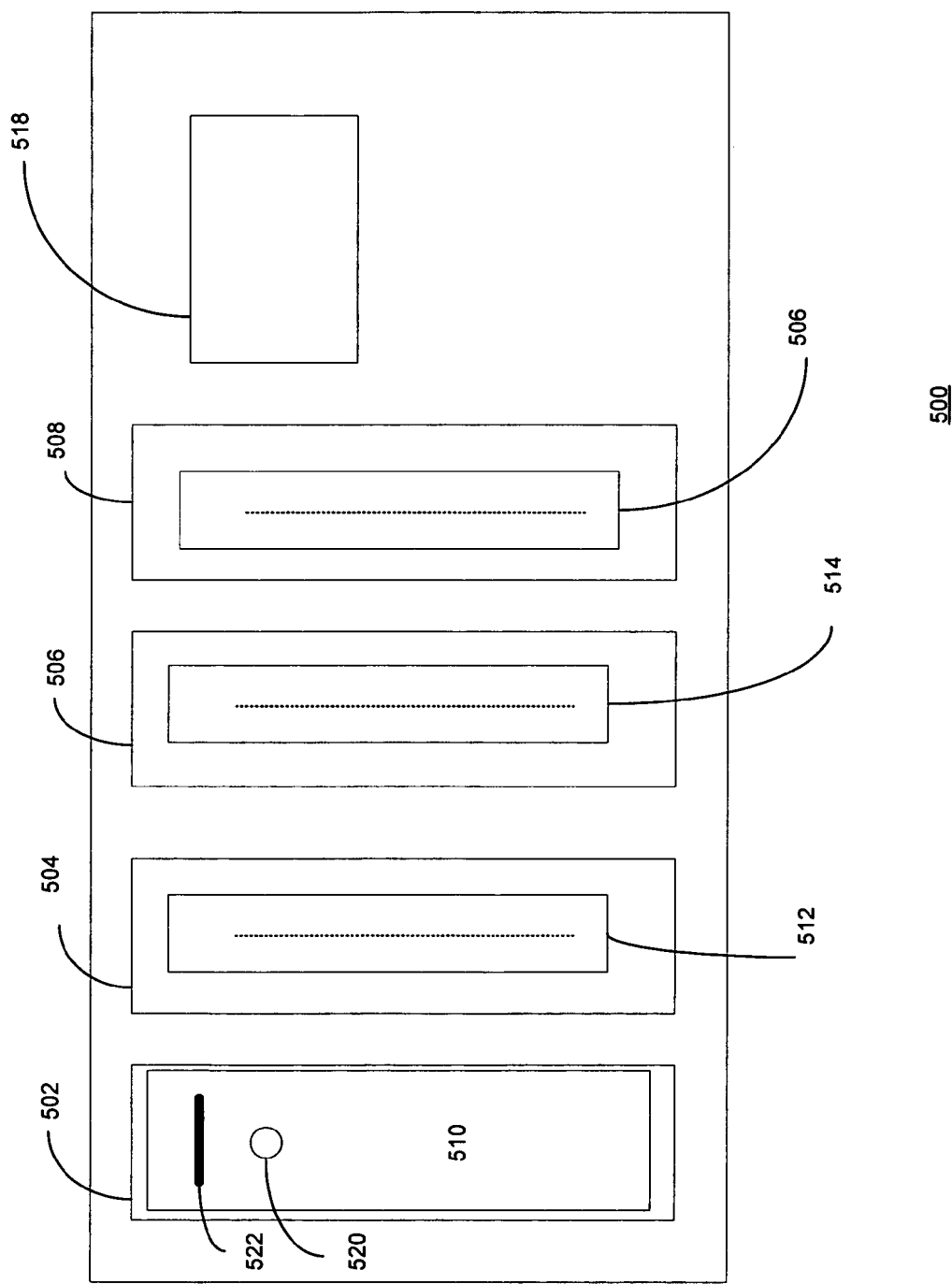
FIG. 5 is a diagram illustrating a storage module chassis and other elements of an embodiment of the invention herein.

FIG. 5 shows a front view of a storage module chassis 500 in FIG. 5. As shown the storage module chassis 500 has four receptacles 502–508 for receiving removable disk drive modules. Receptacle 502 is shown as having a removable disk drive module 510 inserted into the receptacle. The removable storage module 510 can include one or more LEDS 520 which can display information about the state of operation of the removable disk drive module 510. Additionally, the removable disk drive module can include a cam lever arm 522 is shown where a user can pull on the lever arm 522 to allow the removable disk drive module 510 to be removed from the receptacle. A connector of the removable disk module would be mated with a connector of a docking base in the storage module chassis. In each of the receptacles 504–508, connectors 512–516 are shown. Each of the connectors would be coupled to a docking base backplane in the storage module chassis as described above and computers could also be coupled to the docking bases. A user interface panel 518 is also provided. This panel can provide the user with information about the state of operation of the system. In one embodiment the storage module will include one or more power supplies, where the storage module chassis 500 can be plugged into a power source and via the connectors of the docking bases, the storage module chassis can provide power to each of the removable drive modules inserted into the receptacles.

Figure 6:
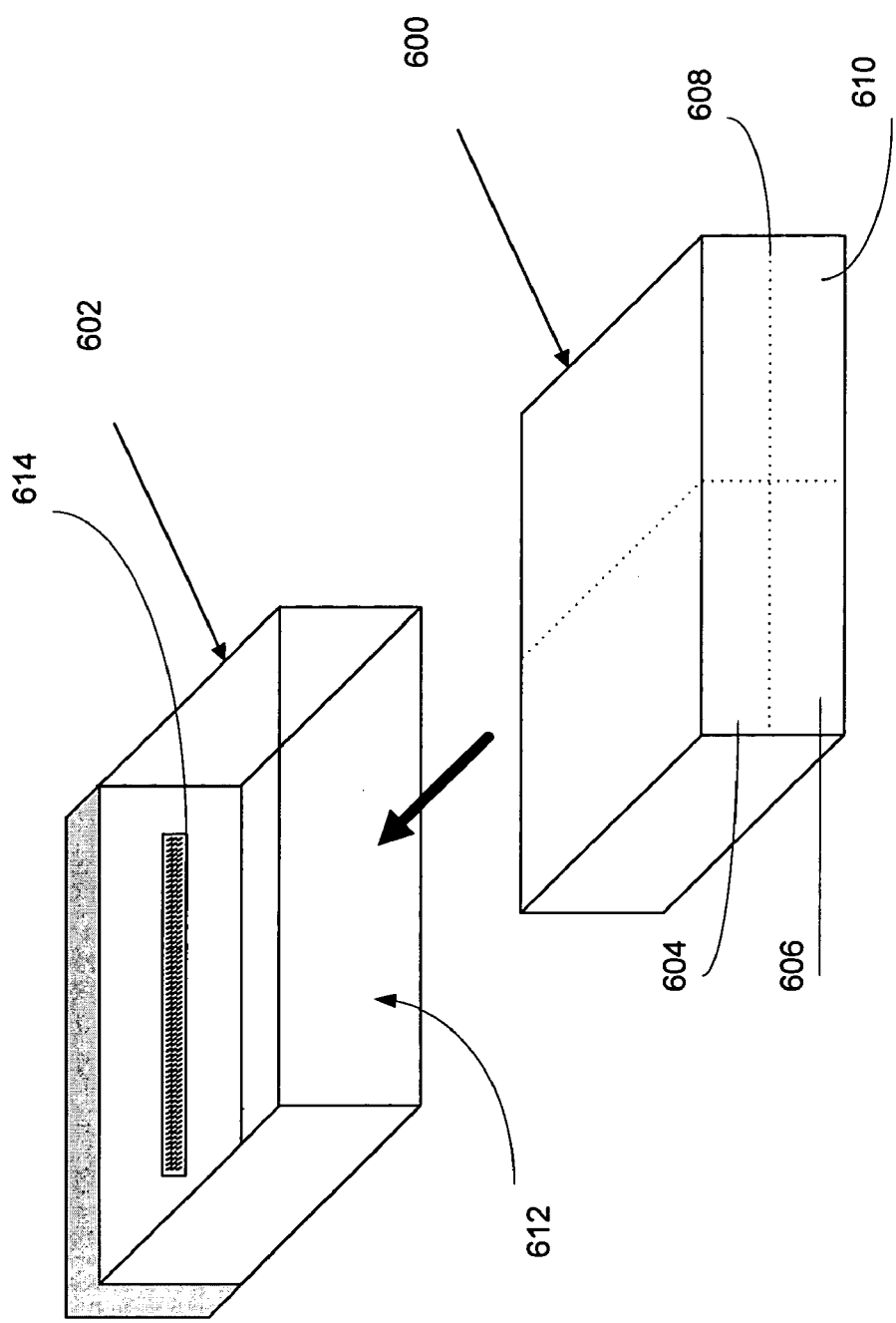
FIG. 6 illustrates a removable storage module being inserted into a docking base of storage module chassis.

FIG. 6 illustrates the insertion of a removable storage module 600 into a docking base unit 602, which could be one of a number of docking base units, of a storage module chassis. Areas 604, 606, 608 and 610 correspond to the lay out of four different drives of the removable storage module 600. The removable storage module would be inserted to the receptacle 612 of the docking base unit, such that a connector of the removable storage module (not shown) would be mated with the connector 614 of the docking base unit 602.

It should be noted that the above descriptions illustrate certain embodiments for illustrative purposes and one of skill in the art would recognize that specific implementations of the invention herein could be implemented in different ways. Thus, while various embodiments of the present invention have been described above, it should be understood that they have been presented by way of example, and not limitation. It will be apparent to persons skilled in the relevant art that various changes in form and detail may be made therein without departing from the spirit and scope of the invention. This is especially true in light of technology and terms within the relevant art(s) that may be later developed. Thus, the present invention should not be limited by any of the above-described exemplary embodiments, but should be defined only in accordance with the following claims and their equivalents.

What is claimed is:

1. A removable storage module, including:
    a housing for holding a plurality of disk drives;
    a connector mounted to the housing;
    a plurality of disk drives disposed in the housing, and each drive having an I/O channel;
    a plurality of switches disposed within the housing, each switch having at least three ports;
    wherein the I/O channel each disk drives is coupled with a first port of a corresponding switch of the plurality of switches;
    wherein the plurality of switches are selectively controllable such that the I/O channel of the disk drive which is coupled to the first port of the switch is coupled with either a second port or a third port of the switch;
    wherein the second port and the third port of the switches are coupled with the connector, such that data from the I/O channel of the drive can be transmitted through the connector from either the second port or the third port of the switch, and wherein the connector is configured such that when the plurality of switches are controlled so that the I/O channels of the plurality of drives are coupled with the second ports of the switches, then the I/O channel of the drives are coupled with a plurality of first host channels through the connector, and when I/O channel of the drives are coupled with the third ports of the switches then the I/O channels of the drives are coupled with a plurality of second host channels through the connector; and
    wherein the connector operates to receive a power supply voltage which is utilized to power the plurality of disk drives, and to drive the plurality of switches.

2. The removable disk drive module of claim 1, wherein the plurality of disk drives includes at least four disk drives, and the plurality of switches includes at least four switches.

3. The removable disk drive module of claim 1, where the I/O channel for each of the disk drives is a serial communication channel.

4. A storage system, the storage system including:
    a docking base unit having a first plurality of host I/O channels, a second plurality of host I/O channels, wherein a first computer is coupled with the first plurality of host I/O channels, and a second computer is coupled with the second plurality of host I/O channels, the docking base unit further including a first connector wherein a power voltage and the first plurality of host I/O channels, and the second plurality of host I/O channels are coupled to the first connector;
    a removable storage module which includes a housing, and a second connector mounted to said housing, the removable storage module further including a plurality of disk drives disposed in the housing, and each drive having an I/O channel, the removable storage module also including a plurality of switches, wherein each of the plurality of switches has at least three ports, and a first port of each switch is coupled to an I/O channel for a corresponding disk drive, wherein the plurality of switches are controllable such that the I/O channel of the disk drive can be selectively coupled with either the second port or the third port of the switch;

wherein the second connector of the removable storage module is coupled to first connector of the docking base unit;

wherein the second port and the third port of the switches are coupled with second connector such that data from the I/O channel of a drive can be transmitted through the second connector from either the second port or the third port of the switch, and wherein the second connector and the first connector are coupled such when the plurality of switches are positioned so that the I/O channels of the plurality of drives are coupled with the second ports of the switches, then the I/O channel of the drives are coupled with the plurality of first host channels through the first connector, and when I/O channel of the drives are coupled with the third ports of the switches then the I/O channels of the drives are coupled with the plurality of second host channels through the first connector; and wherein the second connector receives the power supply voltage through the first connector, wherein the power supply voltage received by the second connector is utilized to power the plurality of disk drives.

5. The system of claim 4 wherein the removable storage module further includes a hot swap controller which operates to control the power supply voltage to allow for coupling and decoupling of the first connector and the second connector without requiring recycling of the power supply voltage.

6. The system of claim 4 wherein the removable storage module further includes a plurality of LEDS which operate provide operational information regarding the storage system.

7. The system of claim 4 wherein the docking base unit includes a controller which receives control communications from the first computer, and from the second computer, and the controller is coupled with the plurality switches, and controls the position of the switches based on the control communications.

\* \* \* \* \*